July 17, 1928.
P. MUELLER ET AL
1,677,792
MEANS FOR TRIMMING SOFT METAL PIPE FLANGES
Original Filed Nov. 12, 1919
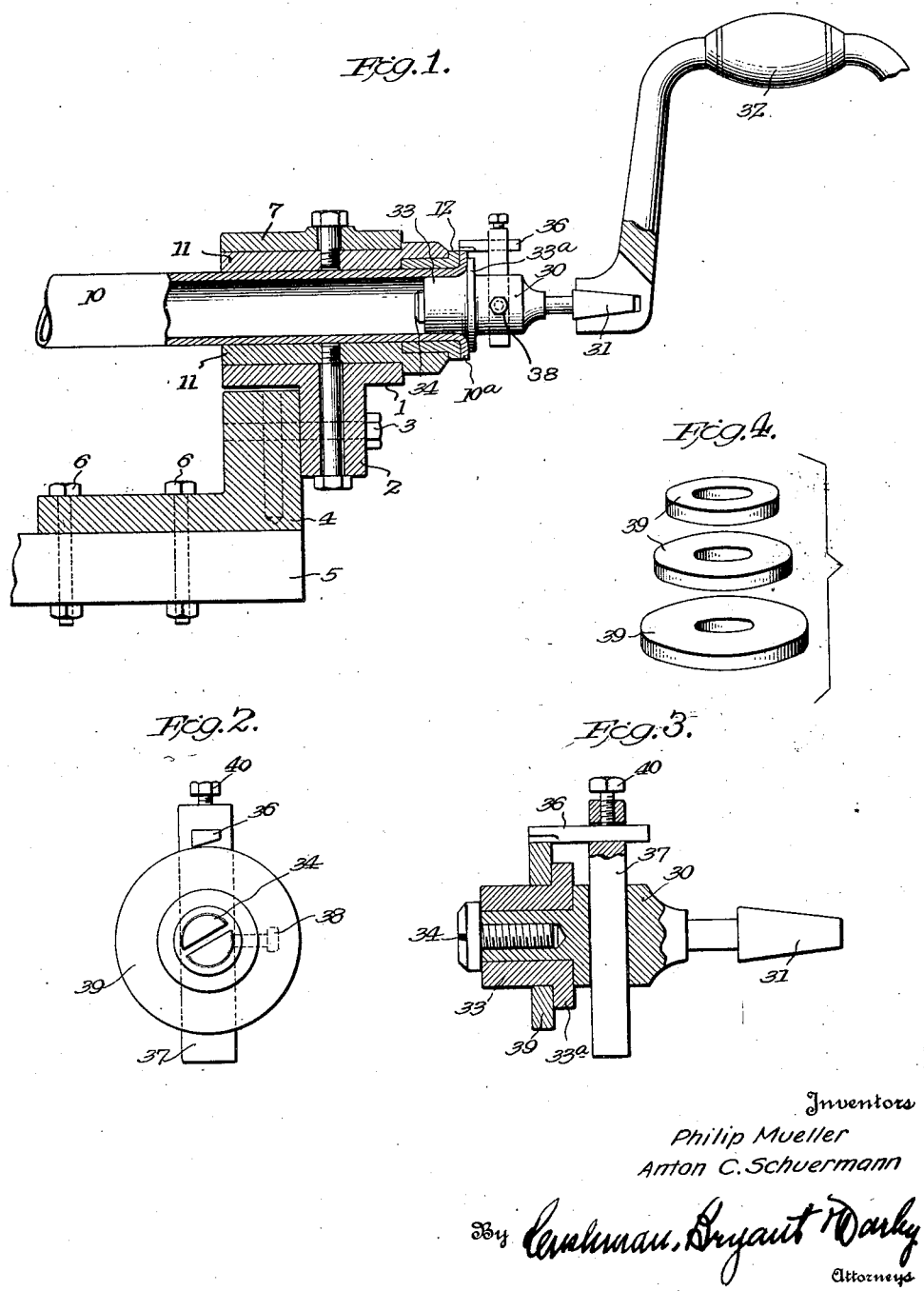
Inventors
Philip Mueller
Anton C. Schuermann
By Cushman, Bryant Darby
Attorneys Patented July 17, 1928.

1,677,792

UNITED STATES PATENT OFFICE.

PHILIP MUELLER AND ANTON C. SCHUERMANN, OF DECATUR, ILLINOIS, ASSIGNORS TO ADOLPH MUELLER, TRUSTEE, OF DECATUR, ILLINOIS.

MEANS FOR TRIMMING SOFT-METAL PIPE FLANGES.

Original application filed November 12, 1919, Serial No. 337,499. Divided and this application filed September 26, 1923. Serial No. 664,939.

The present invention relates to an improvement in means for completing the flanging of soft metal pipes, such as lead service pipes and more particularly to a means for completing the flanging operation by removing any surplus metal that may project beyond the bushing or sleeve against which the flange is formed.

In the earlier application, Serial No. 337,499, of which the present case is a division we have described and claimed a means for producing such a flange as is to be completed by the means hereinafter particularly described and claimed.

In the accompanying drawings:

Fig. 1 is a view of an implement embodying the present invention showing the same in position for completing a flange formed in accordance with the method of the aforesaid earlier application.

Fig. 2 is an end elevation of the body of the trimming tool.

Fig. 3 is a partial elevation and longitudinal section of the trimming tool.

Fig. 4 is a view of a plurality of templets which may be employed to adapt the trimming implement for use with tubes of different diameters.

Referring to the drawings, in the several figures of which corresponding parts are indicated by like reference characters, 1 designates the lower jaw of a body clamp which is provided with an extension 2 adapted to be rigidly secured by screws or bolts 3 to an angular post member 4. The post 4 is connected to a board or other support 5 by bolts 6.

A movable jaw 7 is pivotally connected at one side to the jaw 1 and suitable means are provided by which the two jaws may be held in closed relation and in clamping engagement with a pipe 10 to be flanged.

Each jaw is provided with a liner or bushing 11, which at one end is recessed to receive the collar or sleeve 12 against the outer face of which the end of the soft metal pipe 10 is to be flanged. After the pipe 10 has been properly clamped between the jaws 1, 7, the end thereof projecting beyond the sleeve 12 is expanded against the face of the sleeve or collar 12 by inserting suitably shaped implements therein and applying force to the outer ends thereof.

After the flange has been thus completed it is necessary to remove the portion thereof that projects radially beyond the sleeve or collar 12 and for this purpose we preferably employ the implement which is specifically illustrated in the drawing. As shown this comprises a body 30 which is provided at one end with a shank 31 adapted to be engaged in the socket of an ordinary brace 32. The end of the body remote from the shank 31 is reduced in diameter and on it is fitted a bushing 33 having an exterior diameter corresponding to that of the bore of the pipe 10 into which it is to extend. Such bushing is detachably connected to the body 30 by any suitable means, a screw 34 being shown in the drawing for this purpose. It will be seen that the bushing 33 may be readily removed and replaced by another so that the implement will be readily adapted for use with pipes of different diameters. To adapt the implement for use with a pipe of one particular diameter it is merely necessary to remove the bushing 33 and replace it with one corresponding to the pipe to be acted on.

It will also be understood that the liners 11 are removable so that the clamping means may be easily adjusted to correctly grasp a pipe of any diameter by merely providing liners or bushings of proper thickness.

The cutting blade 36 is fitted in an aperture formed in a post 37 that extends through a passage in the body 30 and is held in the desired position therein by a set screw 38. The blade 36 may be adjusted longitudinally through the aperture in the post 37 and is held in the desired position by a set screw 40.

To enable the blade 36 to be accurately positioned to properly trim portions of the flange 10ª that project radially beyond the outer face of the sleeve or collar 12, a disk 39 having the same diameter as the outer face of the sleeve or collar 12 is initially slipped over the bushing 33 into position against a flange 33ª thereon. The set screws 38 and 40 are loosened and the post 37 and blade 36 adjusted so that the cutting edge of the blade will bear lightly on the periphery of the disk 39 when the parts are rigidly connected by tightening said set screws. The disk 39 is then slipped from the bushing 33 and the latter inserted in the flanged end of the tube 10 which is held within the clamping jaws 1 and 7, as shown in Fig. 1. The parts are so proportioned that when the flange 33ª of the bushing 33 bears against the outer surface of the pipe flange 10ª the cutting edge of the blade 36 will extend through said flange and when the implement is rotated by the brace 32 any portion of said flange projecting beyond the sleeve or collar 12 will be removed and the peripheral edge of the flange formed smooth and flush with or a continuation of said sleeve.

The manner of using and the advantages incident to the means hereinbefore described will be readily apparent from the foregoing description and drawings.

While the invention has been described in connection with a method of forming flanges described and claimed in the aforesaid earlier application, it is evident that the improved trimming implement might be used to remove surplus metal from flanges formed by other methods. As the radial extension of the flange must correspond to the diameter of the outer end of the sleeve or collar 12 and collars of different diameters may be used it is customary to provide a plurality of disks 39 as shown in Fig. 4. In adjusting the cutting blade the operator will, of course, select the disk 39 corresponding to the diameter of the outer end of the sleeve or collar 12 on the particular pipe which is to be operated upon.

There can, of course, be considerable modification of details of the cutting implement without departing from the invention, and therefore except as particular features shown are specifically referred to in the appended claims it is not desired to limit the invention to the exact details illustrated. In other words, the drawings are intended to be illustrative of the invention and not as necessarily limiting all of the claims to the exact details shown.

Having thus described the invention what is claimed and desired to be secured by Letters Patent is:

1. An implement for trimming the peripheral edge of a flange formed at the end of a soft metal pipe comprising a stem having an end portion of the diameter and adapted to be positioned within the bore of the flanged end of a pipe and provided with an abutment adapted to contact with the said end of the pipe, and a cutting blade bodily adjustable both radially and longitudinally of the stem and extending across the edge of the pipe flange when the stem is positioned within the pipe with the abutment thereon in contact with the end of the pipe.

2. The combination with a support adapted to embrace a soft metal pipe, having a flange at one end, and a collar surrounding the pipe and against which the flange is formed, of means for removing metal of the flange that extends radially beyond the collar comprising a rotatable stem adapted to fit within the flanged end of the pipe, and a cutting tool radially spaced from the tube axis a distance corresponding to the longest radius of the collar and of a length to extend entirely across the peripheral edge of the flange.

3. The herein described implement, for trimming the peripheral edge of a flange formed at the end of a soft metal pipe, comprising a rotatable stem adapted to enter the flanged end of a pipe, a sleeve removably secured on the portion of the stem that extends into the pipe, said sleeve having an exterior diameter corresponding to the surrounding bore of the pipe, and provided with a radial projection that engages the outer face of the flange on the pipe, and a cutting tool positioned to engage the edge of the pipe flange.

4. The herein described implement, for trimming the peripheral edge of a flange formed at the end of a soft metal pipe, comprising a rotatable stem adapted to enter the flanged end of a pipe, a sleeve removably secured on the portion of the stem that extends into the pipe, said sleeve having an exterior diameter corresponding to the surrounding bore of the pipe and provided at its outer end with an annular projection that cooperates with the face of the pipe flange to determine the extent to which the stem may enter the pipe, and a cutting tool positioned to engage the edge of the pipe flange.

5. An implement for trimming the peripheral edge of a flange formed at the end of a soft metal pipe comprising a rotatable stem provided at one end with a detachable portion having a diameter corresponding to the bore of a pipe to be treated and including means adapted to contact with the pipe flange and limit the extent to which the implement can be inserted in a pipe, and a cutting blade mounted on the stem and extending across the edge of the pipe flange when the stem is engaged with the pipe end.

6. The herein described implement, for trimming the peripheral edge of a flange formed at the end of a soft metal pipe, comprising a rotatable stem adapted to enter the flanged end of the pipe, a removable sleeve fitted on the portion of the stem that enters the pipe and having the same diameter as the surrounding bore of the pipe, and a cutting tool adjustable laterally of the stem and of a length to extend across the edge of the flange.

7. The herein described implement, for trimming the peripheral edge of a flange formed at the end of a soft metal pipe, comprising a rotatable stem adapted to enter the flanged end of the pipe, radially projecting means on said stem for engaging the outer face of the pipe flange and determining the distance that the stem may enter the pipe, and a cutting tool adjustable laterally of the stem and of a length to extend across the edge of the flange.

In testimony whereof we have hereunto affixed our signatures.

PHILIP MUELLER.
ANTON C. SCHUERMANN.